UNITED STATES PATENT OFFICE.

HENRY D. PERKY, OF DENVER, COLORADO.

BREAD AND METHOD OF PREPARING SAME.

SPECIFICATION forming part of Letters Patent No. 548,086, dated October 15, 1895.

Application filed March 15, 1894. Serial No. 503,777. (No specimens.)

*To all whom it may concern:*

Be it known that I, HENRY D. PERKY, a citizen of the United States, and a resident of Denver, in the county of Arapahoe and State of Colorado, have invented a certain new and useful Article of Food or Bread and the Preparation of the Same; and I do declare the following to be a full, clear, and exact description of the invention, such as will enable others skilled in the art to which it appertains to make and use the same.

An object of the invention is the production of an article of food or bread, consisting of externally-rough porous threads or filaments of wheat or similar grain, having the outer nutrition bran and gluten of the entire berry visibly mingled with the interior starchy portion thereof and adapted by their composition of entire grain-berries and their rough and porous thread-like or shred-like form to constitute, without other shortening or aeration, bread of especially light and wholesome character.

A further object of the invention consists in the novel art or method of preparing the grain or berry and reducing it to form without taking from the grain any of the beneficial qualities provided by nature and presenting the same in convenient form for service as a superior article of food without the aid of experts or skilled labor now required to produce palatable bread.

The usual methods practiced in the manufacture of flour and the resultant bread therefrom are such as to detract from the natural and healthful properties possessed by the grain in its original state. The addition of shortening, yeast, baking-powder, alum, or other foreign ingredients to render the bread light is also detrimental, and the entire method consumes a large amount of time and labor.

According to the improved method which I am now about to describe, the wheat is taken in the whole or berry form, and after being cleaned and thoroughly washed is boiled until corked, without destroying the whole or individual form of the berry. The time of boiling is usually about one hour. This operation, in addition to cooking the grains, removes from them the outer silicious coating and adherent extraneous matter. It also destroys all insect life and removes the traces thereof. Before removal from the boiler the grain is seasoned with salt. The wheat, still in berry form, is, nevertheless, just after the boiling quite soft and its interior or starchy portion especially is watery. It can be easily mashed between the finger and thumb and is not in condition for proper compression until its inner and outer portions are brought more upon an equality in point of consistence. To this end the grain, being removed from the boiler, is allowed to dry for some hours—from twelve to twenty hours being usually sufficient—until the interior of the berry has, from the loss of some of its water, become more consistent. The grain should be constantly stirred or agitated during this part of the process to hasten the drying-out action and to prevent incipient fermentation. I prefer, therefore, to dry out the grain in rotating wire-cloth barrels or cage-tumblers. The berries should now have sufficient interior consistence to enable their outer and interior portions to be effectively incorporated with each other, such incorporation being accomplished by passing the grain between compression-rollers, one or both of which is provided with a series of fine circumferential grooves whereby the berries are mashed and their outer bran-coats, gluten layers, and starchy interior portion thoroughly incorporated together and forced into the grooves of the roller or rollers, whence the resultant food is discharged, by means of a comb or scraper, in the form of long fine filaments or threads of porous character and having a rough exterior admirably adapted to cause them to adhere together when being massed to form loaves or biscuit. The sinuous form and rough or jagged exterior shape of the filaments is designed also to provide small interstices throughout the mass, whereby the bread is thoroughly aerated and made very light.

The food as discharged from the rolls is ready for use without further cooking, or it can be shaped for baking in various ways. The food presented is pure wheat and all the parts of the berry are given to the consumer in attractive form. No chemical change is set up therein by the use of ferments or other foreign ingredients, and the percentage of water in the food is much less than in ordinary bread.

The article as produced is a food or bread composed of superposed or massed layers or deposits of dry, externally rough, porous, sinuous threads or filaments of cooked whole wheat containing intermixed the bran, starch, and gluten of the entire berry, and which is absolutely free from leavening or raising material or their products.

The fine thread-like character of the component filaments of the bread and their disposition therein renders it tender, so that shortening is not required. All the nutrition and beneficial qualities of the berry are preserved in this admirable article of food, while its form gives it tenderness and lightness without the admixture of foreign ingredients.

Having described this invention, what I claim, and desire to secure by Letters Patent, is—

1. A food or bread composed of superposed or massed layers or deposits of dry, externally rough, porous, sinuous threads or filaments of cooked whole wheat containing intermixed the bran, starch, and gluten of the entire berry, and which is absolutely free from leavening or raising material, or their products.

2. The process of reducing cereals for food, consisting, first, in cooking the grain with salt, after it has been thoroughly cleaned, without destroying the whole berry form, second, partially drying the grain with constant agitation until its interior and exterior portions are of substantially the same consistency, and finally, compressing the grain to intimately commingle the outer or bran coats, gluten layers, and starchy, interior portions in the form of porous, rough filaments or threads, substantially as described.

In testimony whereof I affix my signature in the presence of two witnesses.

HENRY D. PERKY.

Witnesses:
J. M. STANLEY,
HARRY C. JAMES.

Correction in Letters Patent No. 548,086.

It is hereby certified that in Letters Patent No. 548,086, granted October 15, 1895, upon the application of Henry D. Perky, of Denver, Colorado, for an improvement in "Bread and Methods of Preparing Same," an error appears in the printed specification requiring correction, viz: In line 47, page 1, the word "corked" should read *cooked;* and that the said Letters Patent should be read with this correction therein that the same may conform to the record of the case in the Patent Office.

Signed, countersigned, and sealed this 29th day of October, A. D. 1895.

[SEAL.]

JNO. M. REYNOLDS,
*Assistant Secretary of the Interior.*

Countersigned:
   S. T. FISHER,
     *Acting Commissioner of Patents.*